(12) United States Patent
Tenghamn et al.

(10) Patent No.: US 7,926,614 B2
(45) Date of Patent: Apr. 19, 2011

(54) PARTICLE MOTION SENSOR MOUNTING FOR MARINE SEISMIC SENSOR STREAMERS

(75) Inventors: Stig Rune Lennart Tenghamn, Katy, TX (US); Andre Stenzel, Richmond, TX (US)

(73) Assignee: PGS Americas, Inc., Houston, TX (US)

( * ) Notice: Subject to any disclaimer, the term of this patent is extended or adjusted under 35 U.S.C. 154(b) by 63 days.

(21) Appl. No.: 12/288,289

(22) Filed: Oct. 17, 2008

(65) Prior Publication Data

US 2009/0065289 A1 Mar. 12, 2009

Related U.S. Application Data

(63) Continuation-in-part of application No. 10/792,511, filed on Mar. 3, 2004, now abandoned.

(51) Int. Cl.
*G01V 1/04* (2006.01)
(52) U.S. Cl. ......... 181/121; 181/113; 181/118; 367/178
(58) Field of Classification Search .................. 181/121, 181/113, 118; 367/178
See application file for complete search history.

(56) References Cited

U.S. PATENT DOCUMENTS

| | | |
|---|---|---|
| 3,720,909 A | 3/1973 | Sikora |
| 4,021,774 A | 5/1977 | Asmundsson et al. |
| 4,078,223 A | 3/1978 | Strange |
| 4,107,804 A | 8/1978 | Bennett |
| 4,241,427 A | 12/1980 | Swenson |
| 4,486,865 A | 12/1984 | Ruehle |
| 4,510,588 A | 4/1985 | Kruka et al. |
| 4,510,696 A | 4/1985 | Roesler |
| 4,618,949 A | 10/1986 | Lister |
| 5,043,952 A | 8/1991 | Hoyle et al. |
| 5,044,461 A | 9/1991 | Aronstam |
| 5,384,753 A * | 1/1995 | Sanders ......................... 367/163 |
| 5,943,293 A | 8/1999 | Luscombe et al. |
| 6,061,302 A * | 5/2000 | Brink et al. .................... 367/188 |
| 6,172,940 B1 | 1/2001 | McConnell et al. |
| 6,571,906 B2 * | 6/2003 | Jones et al. ................... 181/117 |
| 6,607,050 B2 * | 8/2003 | He et al. ....................... 181/110 |
| 6,697,302 B1 | 2/2004 | Cray et al. |
| 6,775,203 B2 | 8/2004 | Fagerås et al. |
| 7,123,543 B2 | 10/2006 | Vaage et al. |

(Continued)

FOREIGN PATENT DOCUMENTS

GB 2392495 3/2004

(Continued)

*Primary Examiner* — Elvin Enad
*Assistant Examiner* — Forrest M Phillips
(74) *Attorney, Agent, or Firm* — E. Eugene Thigpen; Shannon Powers; Richard A. Fagin

(57) ABSTRACT

A marine seismic streamer includes a jacket substantially covering an exterior of the streamer. At least one strength member is disposed along the length of the jacket. A sensor mount is coupled to the strength member. At least one particle motion sensor is suspended within the sensor mount at a selected location along the jacket. The at least one particle motion sensor is suspended in the jacket by at least one biasing device. A mass of the particle motion sensor and a force rate of the biasing device are selected such that a resonant frequency of the particle motion sensor within the sensor jacket is within a predetermined range. The sensor mount is configured such that motion of the jacket, the sensor mount and the strength member is substantially isolated from the particle motion sensor.

34 Claims, 5 Drawing Sheets

U.S. PATENT DOCUMENTS

| | | | |
|---|---|---|---|
| 7,239,577 B2 | 7/2007 | Tenghamn et al. | |
| 7,298,672 B1 | 11/2007 | Tenghamn | |
| 7,460,434 B2 | 12/2008 | Stenzel et al. | |
| 7,463,549 B2 * | 12/2008 | Naess | 367/23 |
| 7,468,932 B2 | 12/2008 | Tenghamn | |
| 7,518,948 B2 | 4/2009 | Stenzel et al. | |
| 7,548,486 B2 | 6/2009 | Tenghamn | |
| 7,684,281 B2 | 3/2010 | Vaage et al. | |
| 7,693,005 B2 | 4/2010 | Stenzel et al. | |
| 2002/0015359 A1 * | 2/2002 | Joh et al. | 367/154 |
| 2002/0103606 A1 * | 8/2002 | Fokkema et al. | 702/32 |
| 2004/0042341 A1 | 3/2004 | Tenghamn et al. | |
| 2006/0193203 A1 | 8/2006 | Tenghamn et al. | |
| 2007/0064528 A1 | 3/2007 | Metzbower et al. | |
| 2007/0258320 A1 | 11/2007 | Harrick | |
| 2008/0008034 A1 | 1/2008 | Tenghamn | |
| 2008/0186803 A1 | 8/2008 | McKey | |
| 2008/0253226 A1 | 10/2008 | Tenghamn et al. | |
| 2009/0010101 A1 | 1/2009 | Lunde et al. | |

FOREIGN PATENT DOCUMENTS

| | | |
|---|---|---|
| WO | 2008127612 A1 | 10/2008 |

* cited by examiner

PARTICLE MOTION SENSOR MOUNTING FOR MARINE SEISMIC SENSOR STREAMERS

CROSS-REFERENCE TO RELATED APPLICATIONS

Continuation in part of application Ser. No. 10/792,511 filed on Mar. 3, 2004 now abandoned.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic surveying systems and techniques. More specifically, the invention relates to arrangements for mounting particle motion sensors used with marine seismic streamers.

2. Background Art

In seismic exploration, seismic data are acquired by imparting acoustic energy into the earth near its surface, and detecting acoustic energy that is reflected from boundaries between different layers of subsurface earth formations. Acoustic energy is reflected when there is a difference in acoustic impedance between layers disposed on opposite sides of a boundary. Signals representing the detected acoustic energy are interpreted to infer structures of and composition of the subsurface earth structures.

In marine seismic exploration, (seismic exploration conducted in a body of water) a seismic energy source, such as an air gun, or air gun array, is typically used to impart the acoustic energy into the earth. The air gun or air gun array is actuated at a selected depth in the water, typically while the air gun or air gun array is towed by a seismic survey vessel. The same or a different seismic survey vessel also tows one or more seismic sensor cables, called "streamers", in the water. Generally the streamer extends behind the vessel along the direction in which the streamer is towed. Typically, a streamer includes a plurality of pressure sensors, usually hydrophones, disposed on the cable at spaced apart, known positions along the cable. Hydrophones are sensors that generate an optical or electrical signal corresponding to the pressure of the water or the time gradient (dp/dt) of the pressure in the water. The vessel that tows the one or more streamers typically includes recording equipment to make a record, indexed with respect to time, of the signals generated by the hydrophones in response to the detected acoustic energy. The record of signals is processed, as previously explained, to infer structures of and compositions of the earth formations below the locations at which the seismic survey is performed.

Marine seismic data often include ghosting and water layer multiple reflections, because water has a substantially different acoustic impedance than the air above the water surface, and because water typically has a substantially different acoustic impedance than the earth formations below the bottom of the water (or sea floor). Ghosting and water layer multiples can be understood as follows. When the air gun or air gun array is actuated, acoustic energy radiates generally downwardly where it passes through the sea floor and into the subsurface earth formations. Some of the acoustic energy is reflected at subsurface acoustic impedance boundaries between layers of the earth formations, as previously explained. Reflected acoustic energy travels generally upwardly, and is ultimately detected by the seismic sensors on one or more streamers. After the reflected energy reaches the streamers, however, it continues to travel upwardly until it reaches the water surface. The water surface has nearly complete reflectivity (a reflection coefficient about equal to −1) with respect to the upwardly traveling acoustic energy. Therefore, nearly all the upwardly traveling acoustic energy will reflect from the water surface, and travel downwardly once again, where is may be detected by the sensors in the streamer. The water-surface reflected acoustic energy will also be shifted in phase by about 180 degrees from the upwardly traveling incident acoustic energy. The surface-reflected, downwardly traveling acoustic energy is commonly known as a "ghost" signal. The ghost signal causes a distinct "notch", or attenuation of the energy within a particular frequency range.

The downwardly traveling acoustic energy reflected from the water surface, as well as acoustic energy emanating directly from the seismic energy source, may reflect from the water bottom and travel upwardly, where it can be detected by the sensors in the streamer. This same upwardly traveling acoustic energy will also reflect from the water surface, once again traveling downwardly. Acoustic energy may thus reflect from both the water surface and water bottom a number of times before it is attenuated, resulting in so-called water layer reverberations. Such reverberations can have substantial amplitude within the total detected acoustic energy, masking the acoustic energy that is reflected from subsurface layer boundaries, and thus making it more difficult to infer subsurface structures and compositions from seismic data.

So-called "dual sensor" cables are known in the art for detecting acoustic (seismic) signals for certain types of marine seismic surveys. One such cable is known as an "ocean bottom cable" (OBC) and includes a plurality of hydrophones located at spaced apart positions along the cable, and a plurality of geophones on the cable, each substantially collocated with one of the hydrophones. The geophones are responsive to the velocity of motion of the medium to which the geophones are coupled. Typically, for OBCs the medium to which the geophones are coupled is the water bottom or sea floor. Using signals acquired using dual sensor cables enables particularly useful forms of seismic data processing. Such forms of seismic data processing generally make use of the fact that the ghost signal is substantially opposite in phase to the acoustic energy traveling upwardly. The opposite phase of the ghost reflection manifests itself by having opposite sign or polarity in the ghost signal as compared with upwardly traveling acoustic energy in the signals measured by the hydrophones, while the geophone signals are substantially the same polarity because of the phase reversal and reversal of the direction of propagation of the seismic energy. While OBCs provide seismic data that is readily used to infer subsurface structure and composition of the Earth, as their name implies, OBCs are deployed on the water bottom. Seismic surveying over a relatively large subsurface area thus requires repeated deployment, retrieval and redeployment of OBCs.

One type of streamer, including both pressure responsive sensors and particle motion responsive sensors is disclosed in U.S. Pat. No. 7,239,577 issued to Tenghamn et al. and assigned to the assignee of the present invention, incorporated herein by reference. So called "dual sensor" streamers make possible the use of a technique for attenuating the effects of ghosting and water layer multiple reflections as disclosed, for example, in U.S. Pat. No. 7,123,543 issued to Vaage et al., and assigned to the assignee of the present invention.

Seismic streamers, because they are towed in the water, are subject to various types of motion in the water, other than the motion imparted by the tow vessel. Particle motion sensors in a streamer respond not only to seismic energy induced motion of the water, but to motion of the streamer cable itself, which motion may be induced by sources other than seismic energy propagating through the water. Motion of the streamer cable may include mechanically induced noise along the streamer cable, among other sources. Such cable motion unrelated to seismic energy may result in noise in the output of the particle motion sensors which may make interpretation of the seismic signals difficult. It is desirable, therefore, to provide a streamer cable having motion sensors arranged in a manner that reduces cable noise coupled into the motion sensors, while substantially maintaining sensitivity of the particle motion sensors to seismic energy.

SUMMARY OF THE INVENTION

A marine seismic streamer according to one aspect of the invention includes a jacket substantially covering an exterior of the streamer. At least one strength member is disposed along the length of the jacket. A sensor mount is coupled to the strength member. At least one particle motion sensor is suspended within the sensor mount at a selected location along the jacket. The at least one particle motion sensor is suspended in the jacket by at least one biasing device. A mass of the particle motion sensor and a force rate of the biasing device are selected such that a resonant frequency of the particle motion sensor within the sensor jacket is within a predetermined range. The sensor mount is configured such that motion of the jacket, the sensor mount and the strength member is substantially isolated from the particle motion sensor.

Other aspects and advantages of the invention will be apparent from the following description and the appended claims.

DETAILED DESCRIPTION

Figure 1:
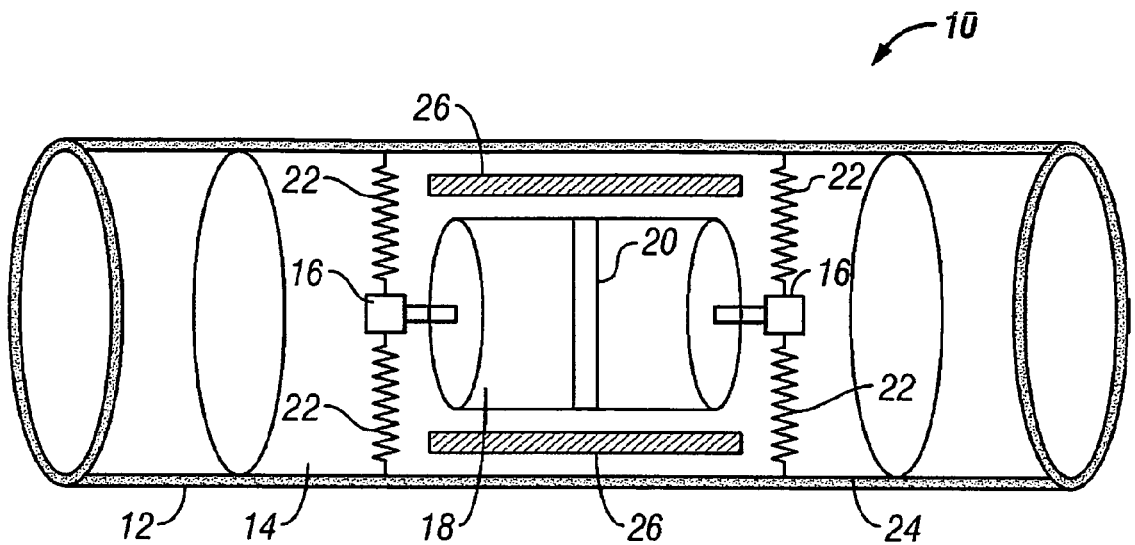
FIG. 1 shows a cut away view of one example of a particle motion sensor in a seismic streamer according to the invention.

One example of a seismic sensor disposed in a section of a marine seismic sensor streamer is shown in cut away view in FIG. 1. The streamer 10 includes an exterior jacket 12 made of any material known in the art for enclosing components of a seismic sensor streamer, for example, polyurethane. The jacket 12 in the present example may include an integral strength member (not shown separately in FIG. 1 for clarity). Alternatively, the streamer 10 may include one or more separate strength members (see FIG. 3C) for transmitting axial load along the streamer 10. At least one sensor housing 14 is disposed inside the jacket 12 at a selected position along the jacket. Typical examples will include a plurality of such sensor housings disposed at spaced apart locations along the jacket 12. The sensor housing 14 may be formed from material such as plastic. In one example the plastic can be a type sold under the trademark LEXAN®, which is a registered trademark of General Electric Co., Fairfield, Conn. In other examples, the sensor housing 14 may be made from steel or similar high strength material. The sensor housing 14 contains active components of a seismic particle motion sensor as will be further explained below. The sensor housing 14 preferably includes slots 26 or other form of acoustically transparent window to enable particle motion within the water (not shown in FIG. 1) in which the streamer 10 is suspended during operation to pass through the wall of the sensor housing 14 where such particle motion can be detected by a particle motion sensor 20. The particle motion sensor 20 in the present example is rigidly mounted inside a fluid tight enclosure 18 which may be formed from plastic, steel or other suitable material known in the art. The enclosure 18 excludes fluid from contact with transducer components (not shown separately) of the sensor 20. Motion of the enclosure 18 is directly coupled to the particle motion sensor 20 for transduction of the particle motion into a signal such as an electrical or optical signal, as is also known in the art. The particle motion sensor 20 may be a geophone, an accelerometer or other sensor known in the art that is responsive to motion imparted to the sensor 2. The motion sensor 20 in the present example can be a geophone, and such sensor generates an electrical signal related to the velocity of the particle motion sensor 20.

In the present example, the jacket 12 and the sensor housing 14 are preferably filled with a liquid 24 having a density such that the assembled streamer 10 is approximately neutrally buoyant in the water (not shown in FIG. 1). The liquid used to fill the jacket 12 may be the same, or may be a different liquid as the liquid used to fill the sensor housing 14. The effective density of the sensor 20 inside the enclosure 18 is also preferably such that the combined sensor 20 and enclosure 18 are approximately neutrally buoyant in the liquid 24. The viscosity of the liquid 24 is preferably such that movement of the enclosure 18 with respect to the sensor housing 14 (such movement enabled by resiliently suspending the enclosure 18 within the housing 14 as further explained below) is dampened. In the present example, the liquid 24 can be synthetic oil.

The streamer 10 may rotate during seismic surveying operations, as is known in the art. It is desirable to avoid transmitting streamer rotation to the particle motion sensor 20. To decouple rotation of the streamer 10 from the particle motion sensor 20, in the example of FIG. 1 the enclosure 18 can be rotatably mounted inside the sensor housing 14. Rotational mounting in this example includes swivels 16 disposed on opposite sides of the enclosure 18, which rotatably suspend the enclosure 18 inside the sensor housing 14 by means of biasing devices 22. In the example of FIG. 1, the swivels 16 may include a rotatable electrical contact of any type known in the art, such that an electrical connection is maintained across the swivel 16 irrespective of rotary orientation of the enclosure 18 inside the housing 14.

The enclosure 18 in such implementation is preferably weighted to one side, or has a selected mass distribution, so as to maintain a selected rotary orientation with respect to Earth's gravity. To reduce transmission of streamer 10 rotation to the sensor 20, the liquid 24 viscosity, in addition to being selected to dampen other types of motion of the enclosure 18 within the sensor housing 14, should also be selected such that the enclosure 18 can substantially avoid being rotated when the streamer 10, and correspondingly the housing 14, are rotated. In the present example, the liquid 24 viscosity is preferably within a range of about 50 to 3000 centistokes.

The configuration shown in FIG. 1, which includes the housing 14 to enclose the sensor enclosure 18 and sensor 20 therein may provide mechanical advantages over configurations which do not have a separate sensor housing 14. Such possible advantages include better resistance to damage to the sensor 20 during handling and use of the streamer 10. The principle of operation of a sensor system according to the invention, as will be further explained below, however, does not require a separate housing to enclose the particle motion sensor. Other examples may be made without having a separate sensor housing 14 inside the jacket 12.

In the present example, the acoustic impedance of the jacket 12, the housing 14 and the enclosure 18 can be substantially the same as that of the water (not shown in FIG. 1) surrounding the streamer 10. Having the acoustic impedance of the jacket 12, housing 14 and enclosure 18 substantially match the surrounding water improves the response of the motion sensor to seismic energy propagating through the water. Preferably, the seismic sensor (including the housing 14 and enclosure 18) has an acoustic impedance within a range of about 750,000 to 3,000,000 Newton seconds per cubic meter (Ns/m$^3$).

As previously explained, the sensor 20 is rigidly coupled to the interior of the enclosure 18. The enclosure 18 is suspended inside the housing 14 by the previously described biasing devices 22. In the present example, the biasing devices 22 can be springs. The purpose of the biasing devices (e.g., springs) 22 is to maintain position of the enclosure 18 within the housing 14, and to resiliently couple motion of the housing 14 to the enclosure 18. Because the enclosure 18 is substantially neutrally buoyant inside the housing 14, the springs 22 in the present example do not need to provide a large restoring force to suspend the enclosure 18 at a selected position inside the housing 14.

Preferably, the springs 22 should be selected to have a force rate small enough such that the resonant frequency of the enclosure 18 suspended in the housing 14 is within a selected range. The selected range is preferably less than about 20 Hz, more preferably less than about 10 Hz. Motion imparted to the streamer 10 below the resonant frequency is coupled from the enclosure 18 (and thus the sensor 20). Movement of the streamer 10 above the resonant frequency will be decoupled from the enclosure 18 (and thus to the sensor 20). As is known in the art, the resonant frequency will depend on the mass of the sensor 20 and enclosure 18, and on the force rate (known as "spring rate", meaning the amount of restoring force with respect to deflection distance) of the biasing device 22. Some types of noise resulting from movement of the streamer 10 may thus be decoupled from the sensor 20.

In other examples, other forms of biasing device may be used instead of the springs 22 shown in FIG. 1. For example, elastomer rings (as will be explained below with respect to FIGS. 2 and 3A through 3E) or similar structures may be used to suspend the enclosure 18 within the housing 14. As is the case with the springs 22 shown in FIG. 1, the force rate of such elastomer rings or other biasing device should be such that a resonant frequency of the enclosure 18 within the housing 14 is within a selected range. In some examples, the selected frequency range is less than about 20 Hz, and more preferably, is less than about 10 Hz. While springs and elastomer rings are specifically disclosed herein, it should be clearly understood that any device which provides a restoring force related to an amount of movement of the sensor (or enclosure thereof) from a neutral or rest position may be used as a biasing device. Other examples of biasing device include pistons disposed in cylinders, having a compressible fluid therein such that movement of the pistons to compress the fluid will result in a force tending to urge the pistons back to a rest position.

In the present example, the sensor 20 is oriented within the enclosure 18 such that when the enclosure 18 maintains the previously described substantially constant rotary orientation, the orientation of the sensor 20 is substantially vertical. "Sensor orientation" as used in this description means the direction of principal sensitivity of the sensor 20. As is known in the art, many types of motion sensors are responsive to motion along one selected direction and are substantially insensitive to motion along any other direction. Maintaining the orientation of the sensor 20 substantially vertical reduces the need for devices to maintain rotational alignment of the streamer 10 along its length, and reduces changes in sensitivity of the sensor 20 resulting from momentary twisting of the streamer 10 during surveying. One purpose for maintaining substantially vertical orientation of the sensor 20 is so that the sensor 20 response will be primarily related to the vertical component of motion of the water (not shown in FIG. 1). The vertical component of motion of the water may be used, as explained in the Vaage et al. '543 patent previously disclosed herein, to determine upgoing components of a seismic wavefield. Other examples, such as will be explained below with reference to FIGS. 3A and 3B, can include a plurality of motion sensors having sensitive axes fixedly oriented along different directions.

Figure 2:
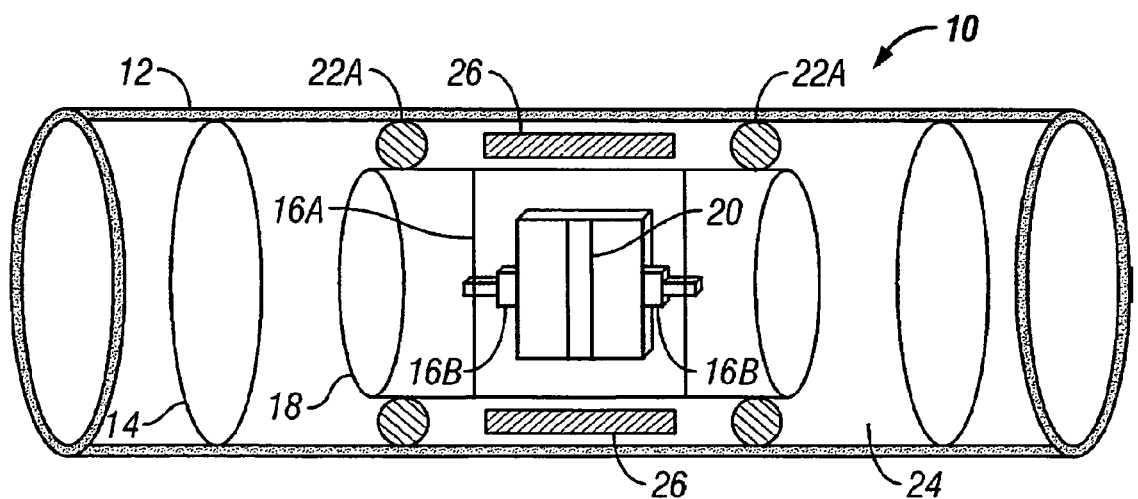
FIG. 2 shows a cut away view of an alternative example of a particle motion sensor in a seismic streamer.

Another example of a particle motion sensor according to the invention is shown in cut away view in FIG. 2. In the example shown in FIG. 2, the jacket 12 can be substantially the same configuration as in the previous example, and may include an integral strength member (not shown separately). The sensor housing 14 in the present example may also be the same as in the previous example and may include one or more slots 26 or other acoustically transparent windows. The interior of the jacket 12 and the interior of the housing 14 in the present example are also preferably filled with liquid 24 having viscosity in a range of about 50 to 3000 centistokes as in the previous example. Synthetic oil may be used for the liquid as in the previous example.

The motion sensor 20 in the present example may be an accelerometer, geophone, or any other type of motion sensor known in the art, as in the previous example. In the present example, however, the sensor 20 can be mounted on gimbal bearings 16B, including electrical swivels therein. The gimbal bearings 16B are mounted inside a gimbal frame 16A. The gimbal frame 16A is rigidly coupled to a sensor enclosure 18. The sensor enclosure 18 can be similar in exterior configuration to the sensor enclosure (18 in FIG. 1) in the previous example. Preferably, the gimbal bearings 16B are coupled to the sensor 20 above the center of gravity of the sensor 20 so that the sensor 20 will orient itself by gravity along a selected direction. Preferably the selected direction is such that the selected direction is substantially vertical, and corresponds to the sensitive direction of the sensor 20.

In the example shown in FIG. 2, the sensor enclosure 18 is suspended within the sensor housing 14 using one or more biasing devices as explained above with respect to FIG. 1. In the present example, the biasing devices can be elastomer or other form of resilient rings 22A. The resilient rings 22A should have a compressibility, also referred to as "durometer"

measurement or reading, (and thus have an equivalent force rate) such that the resonant frequency of the sensor enclosure 18 within the sensor housing 14 is within a selected range. In one example, the resonant frequency is preferably less than about 20 Hz, or more preferably less than about 10 Hz. Alternatively, the sensor enclosure 18 may be suspended within the sensor housing 14 using springs (not shown), as in the previous example. Springs and elastomer rings are only two examples of biasing devices used to suspend the sensor enclosure 18 within the sensor housing 14. One advantage of using elastomer rings, or other form of resilient ring, for the biasing device 22A is that such rings when configured as shown in FIG. 2 provide substantially omnidirectional restoring force, meaning that irrespective of the direction along which the sensor enclosure 18 is moved with respect to the sensor housing 14, a corresponding restoring force is exerted by the resilient ring to urge the sensor enclosure 18 back to its rest position. As a result, using resilient rings for the biasing device can simplify the construction of a seismic sensor according to the invention.

The example shown in FIG. 2 has a generally cylindrically shaped enclosure 18, which is suspended by the elastomer rings 22A within the jacket 12. The jacket 12 may itself be substantially cylindrical in shape. The exact shape of the enclosure 18 and jacket 12 are not important to the principle of operation of the invention. However, the construction of a seismic sensor according to the invention can be simplified using a cylindrically shaped enclosure fitted within a cylindrically shaped jacket 12, so that the enclosure 18 is suspended in the jacket 12 only by the elastomer rings 22A.

As previously explained, it is only necessary to suspend the enclosure 18 within the housing 14 such that motion of the streamer 10 is resiliently coupled (through the biasing device—the elastomer rings 22A in the present example) to the sensor enclosure 18. By resiliently coupling the motion of the streamer 10 to the enclosure 18 through the elastomer rings 22A, motion related to certain types of acoustic noise transmitted along the streamer 10 will be substantially decoupled from the sensor 20. Decoupling some types of streamer motion from the sensor 20 can improve motion detection primarily related to particle motion of the water (not shown in FIG. 2) in which the streamer 10 is suspended during use, as will be further explained below.

Figure 3A:
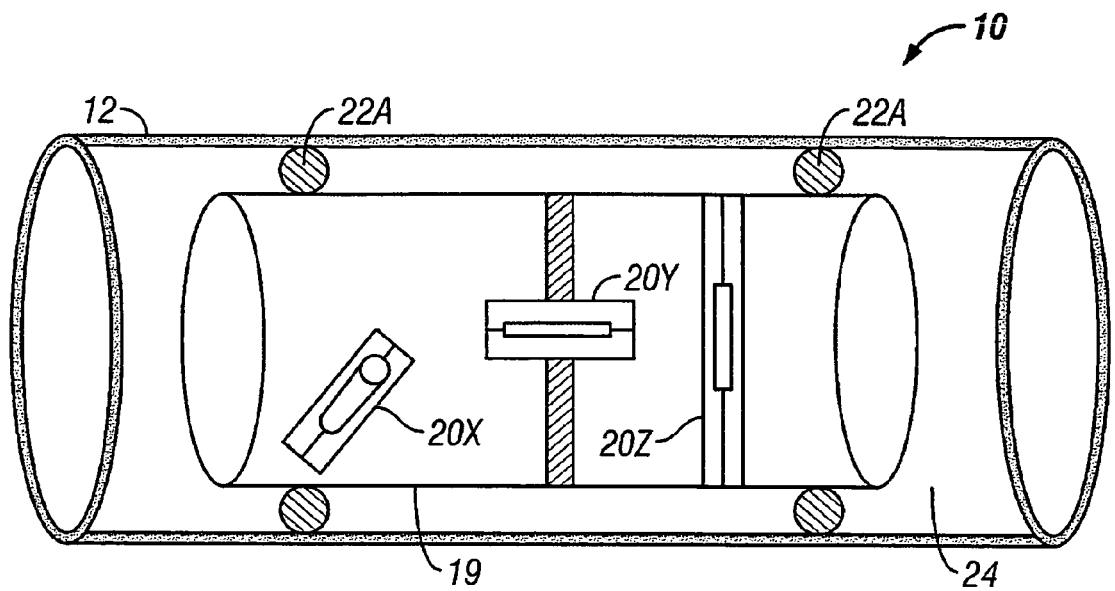
FIG. 3A shows a cut away view of another example of a particle motion sensor in a marine seismic streamer having multiple motion sensors.

The examples of a sensor according to the invention described with reference to FIGS. 1 and 2 include various implementations of a particle motion sensor rotatably suspended inside the streamer. Rotatable suspension of the motion sensor as in the previous examples enables maintaining the sensitive direction of the motion sensor along a selected direction. Another example, which will now be explained with reference to FIG. 3A, includes a plurality of motion sensors which may be suspended inside the streamer in a rotationally fixed manner. FIG. 3A shows a motion sensor enclosure 19 which is suspended inside the jacket 12 using biasing devices. In the example of FIG. 3A, the biasing devices can be elastomer rings 22A, which may be similar to the elastomer rings as explained above with reference to FIG. 2. The elastomer rings 22A should have a durometer reading such that the resonant frequency of the enclosure 19 suspended within the jacket 12 is within a selected range. In some examples, the resonant frequency is less than about 20 Hz, and more preferably is less than about 10 Hz. The jacket 12 may be substantially the same construction as in the previous examples, including an integral strength member (not shown separately). The jacket 12 is preferably filled with liquid substantially as explained above with reference to FIGS. 1 and 2.

The example shown in FIG. 3A includes three separate particle motion sensors, shown at 20X, 20Y, 20Z, each rigidly coupled to the interior of the enclosure 19. Each of the three motion sensors 20X, 20Y, 20Z is mounted within the enclosure 19 such that the sensitive axis of each motion sensor 20X, 20Y, 20Z is oriented along a different direction. It is generally convenient to orient each of the motion sensors 20X, 20Y 20Z along mutually orthogonal directions, however other relative orientations for motion sensors are well known in the art. The arrangement of multiple motion sensors as shown in FIG. 3A may eliminate the need to provide rotatable mounting of the motion sensor enclosure 19 within the streamer 12, and further, may provide the streamer with the capability of detecting particle motion along more than one direction. As in the previous examples, the motion sensors 20X, 20Y, 20Z in the example of FIG. 3A may be geophones, accelerometers or any type other particle motion sensor known in the art. Also as in the previous examples, explained above with reference to FIGS. 1 and 2, the example of FIG. 3A preferably has an effective density of the enclosure 19 having the sensors 20X, 20Y, 20Z therein such that the enclosure 19 is substantially neutrally buoyant in the liquid, so as to minimize the restoring force needed to be exerted by the elastomer rings 22A.

The example shown in FIG. 3A includes three mutually orthogonal motion sensors mounted within a single enclosure 19. Alternatively, and with reference to FIG. 3B, individual motion sensors, shown also as 20X, 20Y and 20Z, each having a respective enclosure 19X, 19Y, 19Z may be suspended within the jacket 12 using elastomer rings 22A, having durometer reading selected such that the resonant frequency of each of the enclosures 19X, 19Y, 19Z is less than about 20 Hz, and more preferably is less than about 10 Hz. The sensors 20X, 20Y 20Z are arranged such that the sensitive axis of each sensor is oriented along a different direction than the other two sensors. In one example, the sensitive axes of the sensors 20X, 20Y, 20Z are mutually orthogonal. The jacket 12 in the example of FIG. 3B is preferably filled with liquid 24 substantially as explained above with reference to FIGS. 1 and 2.

Figure 3B:
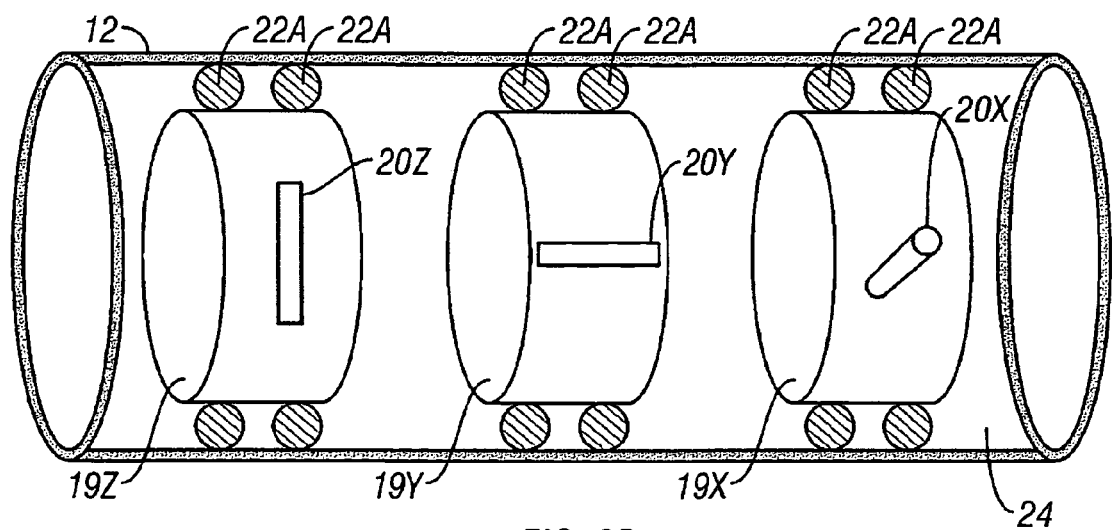
FIG. 3B shows a cut away view of an alternative arrangement to that shown in FIG. 3A of multiple particle motion sensors.

In order to resolve the direction from which seismic energy originates using multiple, rotationally fixed sensors as shown in FIGS. 3A and 3B, it is desirable to have an orientation sensor (not shown) disposed proximate the particle motion sensors. The orientation sensor may include three mutually orthogonal accelerometers, measurements from which may be used to determine the direction of Earth's gravity with respect to the streamer 10. Other examples may include three mutually orthogonal magnetometers, or a gyroscope, to determine the orientation of the streamer with respect to an Earth magnetic or Earth geographic reference. Such orientation sensors are well known in the art. See, for example, U.S. Pat. No. 4,510,696 issued to Roesler (Reissued as U.S. Reissue Pat. No. RE 33,708), entitled, Surveying of boreholes using shortened non-magnetic collars, and U.S. Pat. No. 4,021,774 issued to Asmundsson et al.

It will be readily apparent to those skilled in the art that the multiple sensor arrangements shown in FIGS. 3A and 3B may also be combined with the rotatable mounting arrangement shown in FIG. 1 (including, for example, electric swivel 16 in FIG. 1) to provide that multiple motion sensors each remain substantially oriented along a selected direction with respect to Earth's gravity. The example explained with reference to FIG. 1 provides that the single motion sensor maintains a substantially vertical orientation. In an example combining rotational mounting with multiple motion sensors, the multiple motion sensors may be arranged such that their sensitive axes remain substantially mutually orthogonal, and in some examples one of the sensors maintains a substantially vertical orientation.

Figure 3C:
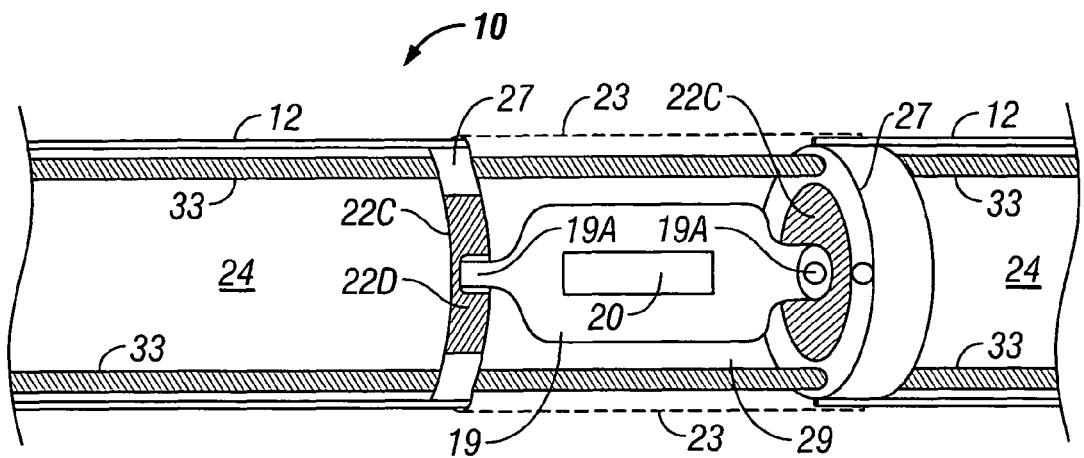
FIG. 3C shows an alternative arrangement of sensor mount that isolates motion of the streamer from the particle motion sensor.

In a particular example, the particle motion sensor may be mounted within the streamer such that motion of the streamer is substantially isolated from the particle motion sensor and from the fluid surrounding the particle motion sensor. Referring to FIG. 3C, a portion of the streamer is shown at a position where one of the particle motion sensors 20 is located. The particle motion sensor 20 may be disposed in an enclosure 19 as in the previous examples, and the combination of the sensor 20 and enclosure may have acoustic impedance and/or density properties substantially as explained elsewhere herein. The longitudinal ends of the enclosure 19 may each include an extension 19A of relatively smaller diameter than the longitudinal center of the enclosure 19 to fit in a corresponding opening 22D in the center of a biasing device 22C. The biasing devices 22C may be made from elastomer and preferably have resilient (spring constant) properties as explained above with reference to previous examples. In the present example, the biasing devices 22C may be in the form of annular cylinders, and have elasticity selected to provide the above described resonant frequency when suspending the particle motion sensor 20 in its enclosure 19 therein. The biasing devices 22C may each be disposed in a suitably formed opening in a streamer jacket end plate 27. The end plates may be formed, for example, from a rigid plastic such as polypropylene. Strength members 33 may extend along the entire interior of the jacket 12 to transmit axial load along the length of the streamer 10. The strength members 33 may be made from fiber rope, such as a fiber sold under the trademark VECTRAN, which is a registered trademark of Hoescht Celanese Corp., New York, N.Y. The end plates 27 may be fixed to the strength members 33 as shown in FIG. 3C, such as by adhesive bonding, for example. Configured as shown in FIG. 3C, the end plates 27 seal the ends of the jacket so as to form sealed chambers in which liquid 24 such as the oil explained above may be disposed. In some examples, the liquid 24 may be substituted by curable gel. In the portions of the streamer in which a particle motion sensor 20 is disposed between adjacent end plates 27, the respective portion of the jacket 12 may be omitted, or may be substituted by a thin, flexible membrane 23, such as may be made from plastic or similar material. The membrane 23 has flexibility and thickness selected to substantially isolate motion of the streamer from all elements disposed between the adjacent end plates 27 where the sensor 20 is located. In examples that use the membrane 23, the interior of the membrane may be filed with liquid 29 such as oil or water. Thus, the membrane 23 should be thin and flexible enough to substantially avoid transmission of any motion of the streamer into the liquid (oil, water, etc.) disposed within the interior of the membrane 23. At the same time, particle motion in the water, particularly such as caused by seismic energy, is freely transmitted through the membrane 23. In examples where the membrane 23 is not used, the space between the adjacent end plates 27 will be filed with sea water when the streamer is deployed therein.

Figure 3D:
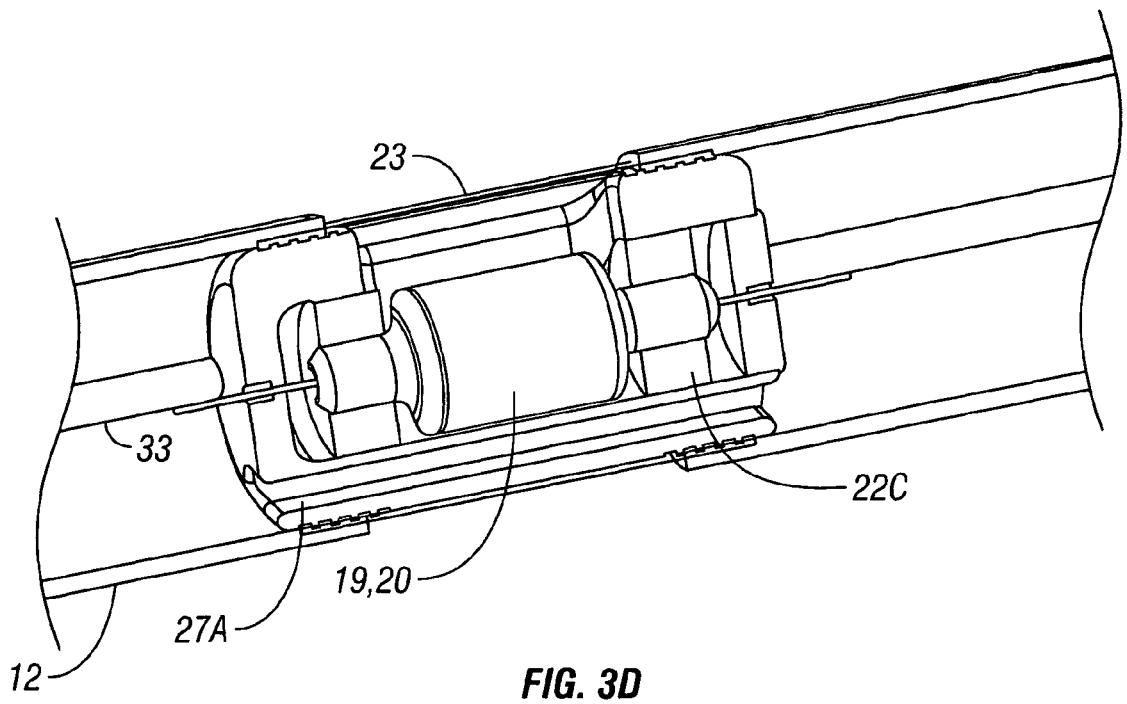
FIGS. 3D and 3E show an alternative arrangement of sensor mount that isolates streamer motion from the sensor.
Figure 3E:
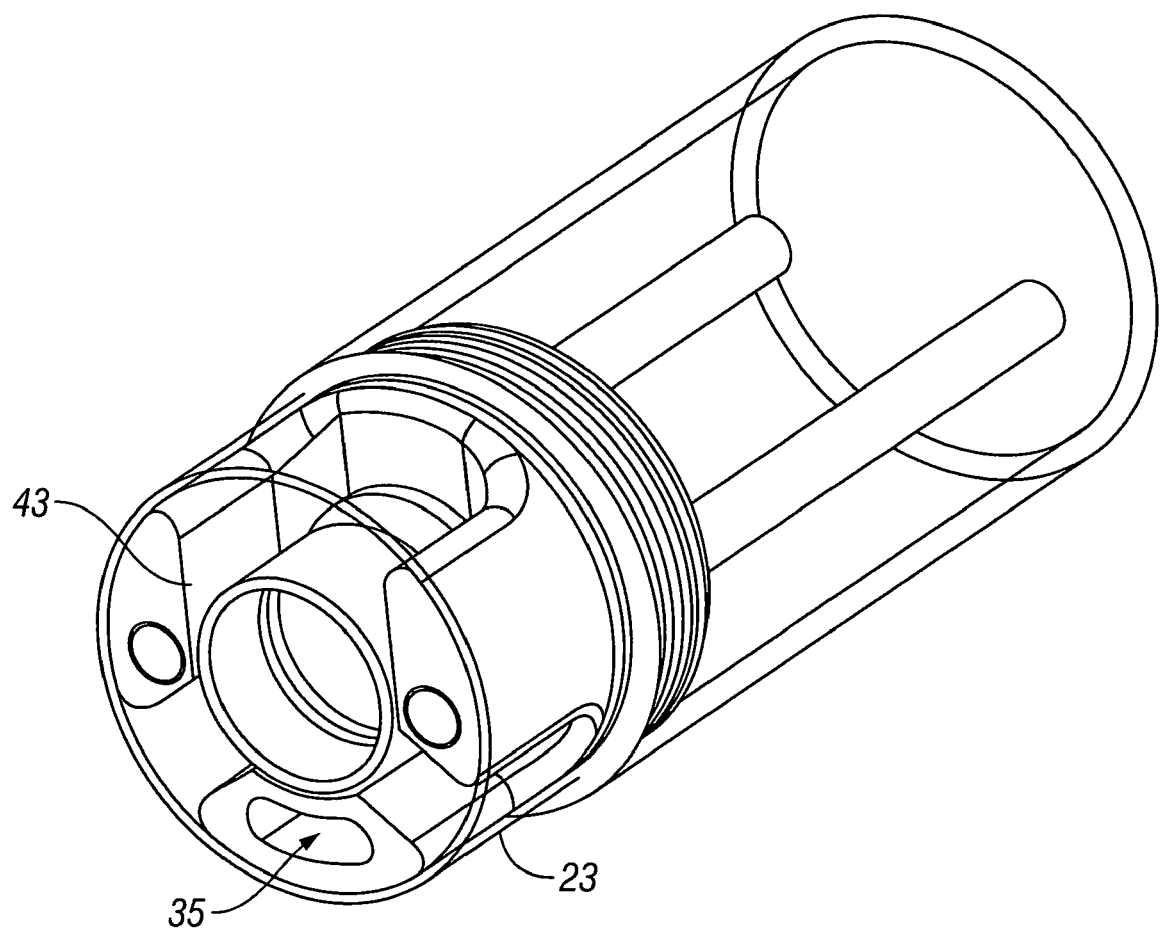

An alternative device for mounting the particle motion sensor is shown in FIGS. 3D and 3E. Instead of using separate end plates as shown in FIG. 3C, the sensor mount may be a single sensor mount structure 27A formed from, for example, plastic such as polypropylene. The longitudinal ends of the sensor mount 27A may have a similar shape as the end plates (27 in FIG. 3C) shown in the previous example, thus having a substantially circular cross section so as to fill the internal diameter of the jacket 12. The shape of the longitudinal ends of the sensor mount 27A may include an opening in which the biasing device 22C may be disposed. The biasing device 22C may itself have a central opening in which the extensions of the sensor enclosure (19 in FIG. 3C) may be disposed. The sensor mount 27A may include a longitudinal through passage (35 in FIG. 3E) for protected passage of cables, wires, and the like along the length of the streamer. The sensor mount 27A may be configured such that a portion disposed between the longitudinal ends may have a substantial part of the circumference exposed to the exterior, such as shown (particularly 43 in FIG. 3E). By having such exposure, motion of the sensor mount 27A will substantially not excite motion of any fluid disposed between the longitudinal ends of the sensor mount 27A. Such configuration will substantially isolate motion of the streamer 10 from motion of the particle motion sensor 20. In the present example, the membrane 23 may be used or omitted, just as for the example explained above with reference to FIG. 3C, and may have substantially the same properties as described above.

Figure 4:
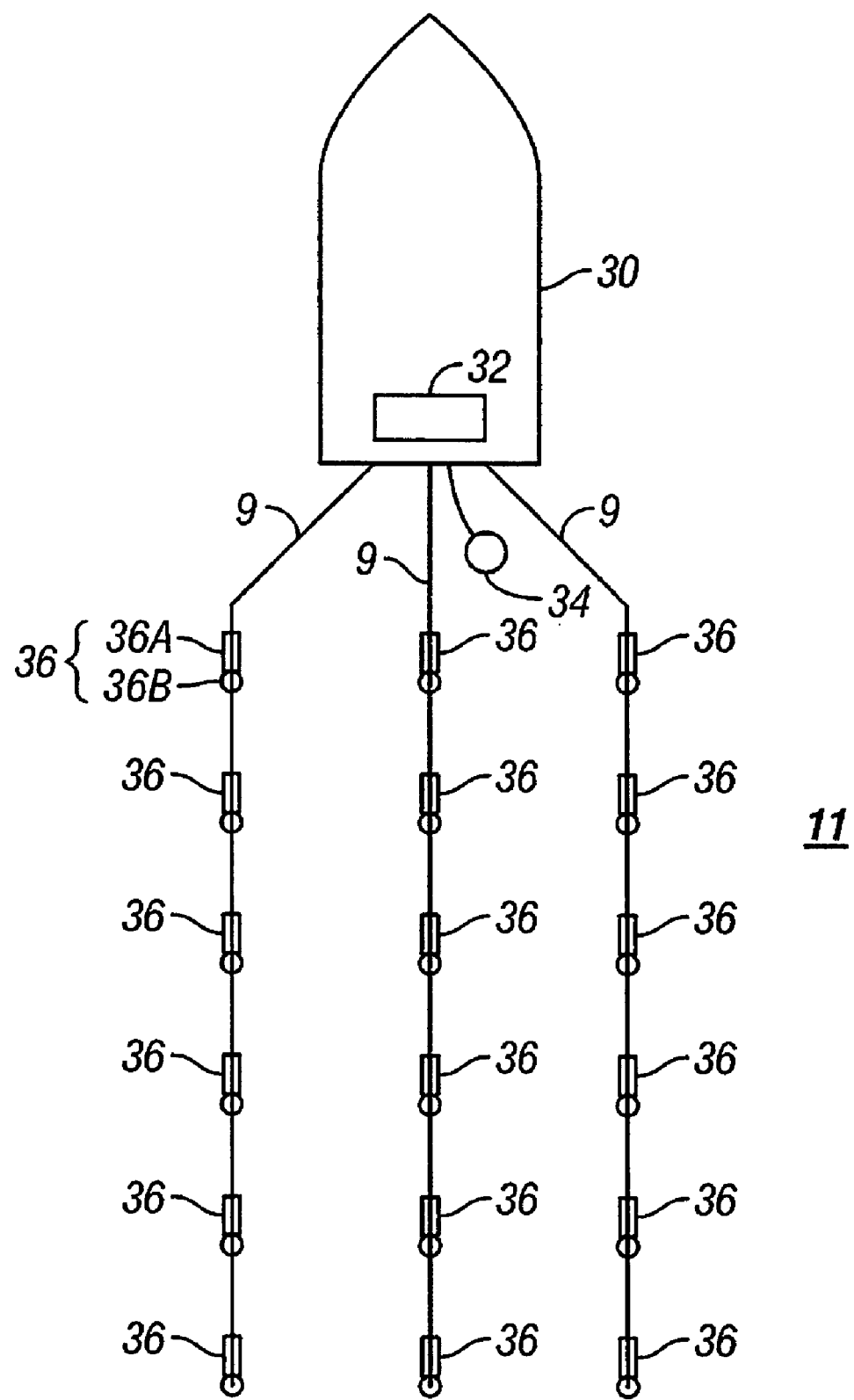
FIG. 4 shows an example marine seismic surveying system including sensors according to the invention.

One example of a marine seismic survey system that includes particle motion sensors according to the invention is shown schematically in FIG. 4. The system includes a seismic survey vessel 30 adapted to tow one or more streamers 9 through a body of water 11. The survey vessel 30 typically includes a data acquisition and recording system 32 that may include navigation devices to determine the geographic position of the vessel 30 and each one of a plurality of sensor pairs 36 disposed at spaced apart locations along the one or more streamers 9. The data acquisition and recording system 32 may also include a controller for actuating a seismic energy source 34. The source 34 may be an air gun, a water gun, or array of such guns, for example. Each of the streamers 9 in the present example includes a plurality of spaced apart seismic sensor pairs 36. Each sensor pair 36 includes at least one sensor responsive to pressure, shown generally at 36B, each of which may be a hydrophone. Each sensor pair 36 also includes at least one particle motion sensor 36A. The particle motion sensor may be any one of the examples explained above with reference to FIGS. 1, 2 and 3. In the particular example shown in FIG. 4, each of the pressure sensors 36B and each of the particle motion sensors 36A in each sensor pair 36 are substantially collocated, or located so that seismic signals detected by each of the pressure sensor 36B and motion sensor 36A represent substantially the same part of the Earth's subsurface. Other examples may include more than one of each of a pressure sensor and motion sensor for each sensor pair. For example, as many as eight individual pressure sensors and eight individual motions sensors may be included in each sensor pair. Still other examples may include one or more pressure sensors on one or more of the streamers at locations other than collocated with each particle motion sensor.

Seismic sensors and marine seismic data acquisition systems according to the invention may provide improved detection of seismically induced particle motion in a body of water, and may provide reduced sensitivity to noise induced by motion of a seismic streamer cable.

While the invention has been described with respect to a limited number of examples, those skilled in the art, having benefit of this disclosure, will appreciate that other examples can be devised which do not depart from the scope of the invention as disclosed herein. Accordingly, the scope of the invention is limited in scope only by the attached claims.

What is claimed is:

1. A marine seismic streamer, comprising:
 a jacket substantially covering an exterior of the streamer;
 at least one strength member disposed along the length of the jacket;

a sensor mount disposed at a selected location along the jacket; and at least one particle motion sensors suspended within the sensor mount by at least one biasing device, a mass of the particle motion sensor and a force rate of the biasing device selected such that a resonant frequency of the particle motion sensor within the sensor mount is within a predetermined range, and wherein the sensor mount is configured such that motion of the jacket, the sensor mount and the strength member is substantially isolated from the particle motion sensor, wherein:

the jacket is filled with a first liquid having a density selected such that the jacket is substantially neutrally buoyant when the jacket is suspended in a body of water; and the sensor mount is disposed inside the jacket and is filled with a second liquid having a density selected such that the sensor mount is substantially neutrally buoyant in the first liquid.

2. The streamer of claim 1 further comprising an orientation sensor coupled to at least one particle motion sensor.

3. The streamer of claim 1 wherein the first liquid has a viscosity in a range of about 500 to 1,000 centistokes.

4. The streamer of claim 1 wherein the sensor is rotatably suspended within the sensor mount and has a mass distribution such that the motion sensor maintains a selected rotary orientation.

5. The streamer of claim 4 wherein the rotatable suspension comprises gimbal bearings, the gimbal bearings supported in a frame coupled through the at least one biasing device to the sensor mount.

6. The streamer of claim 4 wherein the selected orientation of the motion sensor is substantially vertical.

7. The streamer of claim 4 wherein the rotatable mounting comprises a swivel adapted to enable full rotation of the motion sensor while maintaining electrical contact through the swivel.

8. The streamer of claim 1 wherein the motion sensor, the jacket and the first liquid when combined have an acoustic impedance in a range of about 750,000 Newton-seconds per cubic meter and 3,000,000 Newton-seconds per cubic meter.

9. The streamer of claim 1 wherein the resonant frequency is between about 10 Hz and about 20 Hz.

10. The streamer of claim 1 wherein the resonant frequency is less than about 10 Hz.

11. The streamer of claim 1 wherein the at least one biasing device comprises a spring.

12. The streamer of claim 1 wherein the at least one biasing device comprises a resilient ring.

13. The streamer of claim 1 wherein the motion sensor comprises a geophone.

14. The streamer of claim 1 wherein the motion sensor comprises an accelerometer.

15. The streamer of claim 1 further comprising a pressure sensor disposed along the jacket substantially collocated with the motion sensor.

16. The streamer of claim 15 wherein the at least one pressure sensor comprises a hydrophone.

17. A marine seismic streamer, comprising:

a jacket substantially covering an exterior of the streamer;

at least one strength member disposed along the length of the jacket;

a sensor mount disposed at a selected location along the jacket; and at least one particle motion sensors suspended within the sensor mount by at least one biasing device, a mass of the particle motion sensor and a force rate of the biasing device selected such that a resonant frequency of the particle motion sensor within the sensor mount is within a predetermined range, and wherein the sensor mount is configured such that motion of the jacket, the sensor mount and the strength member is substantially isolated from the particle motion sensor, wherein the sensor mount comprises end plates at each longitudinal end of the sensor mount, the sensor mount end plates substantially sealing an interior of the jacket, and wherein the particle motion sensor is at least one of (a) directly exposed to an environment outside the jacket, and (b) surrounded by a membrane, the membrane having flexibility and thickness selected to substantially isolate motion of the streamer from a fluid disposed within the membrane.

18. A marine seismic survey system, comprising:

a plurality of laterally spaced apart streamers configured to be towed by a vessel, each streamer including:

a jacket covering an exterior of the streamer, at least one strength member disposed along the length of the jacket, a plurality of longitudinally spaced apart sensor mounts disposed at selected locations along the jacket, and a particle motion sensor suspended within each sensor mount by at least one biasing device, a mass of the particle motion sensor and a force rate of the biasing device selected such that a resonant frequency of the particle motion sensor within the sensor mount is within a predetermined range, and wherein each sensor mount is configured such that motion of the jacket, the sensor mount and the strength member is substantially isolated from the respective particle motion sensor, wherein:

each jacket is filled with a first liquid having a density selected such that each jacket is substantially neutrally buoyant when suspended in a body of water; and each sensor mount is disposed inside the jacket and is filled with a second liquid having a density selected such that the sensor mount is substantially neutrally buoyant in the first liquid.

19. The system of claim 18 wherein the first liquid has a viscosity in a range of about 500 to 1,000 centistokes.

20. The system of claim 18 wherein each sensor is rotatably suspended within the respective sensor mount and has a mass distribution such that the motion sensor maintains a selected rotary orientation.

21. The system of claim 20 wherein the rotatable suspension comprises gimbal bearings, the gimbal bearings supported in a frame coupled through the at least one biasing device to the sensor mount.

22. The system of claim 20 wherein the selected orientation of at least one of the plurality of motion sensors is substantially vertical.

23. The system of claim 20 wherein the rotatable mounting comprises a swivel adapted to enable full rotation of the motion sensor while maintaining electrical contact through the swivel.

24. The system of claim 18 wherein each motion sensor, the jacket and the first liquid when combined have an acoustic impedance in a range of about 750,000 Newton-seconds per cubic meter and 3,000,000 Newton-seconds per cubic meter.

25. The system of claim 18 wherein the resonant frequency is between about 10 Hz and about 20 Hz.

26. The system of claim 18 wherein the resonant frequency is less than about 10 Hz.

27. The system of claim 18 wherein the at least one biasing device comprises a spring.

28. The system of claim 18 wherein the at least one biasing device comprises a resilient ring.

29. The system of claim 18 wherein the motion sensor comprises a geophone.

30. The system of claim 18 wherein the motion sensor comprises an accelerometer.

31. The system of claim 18 further comprising a pressure sensor disposed along the jacket substantially collocated with each motion sensor.

32. The system of claim 31 wherein at least one pressure sensor comprises a hydrophone.

33. The system of claim 18 further comprising an orientation sensor coupled to at least one particle motion sensor.

34. A marine seismic survey system, comprising:
a plurality of laterally spaced apart streamers configured to be towed by a vessel, each streamer including:
a jacket covering an exterior of the streamer,
at least one strength member disposed along the length of the jacket,
a plurality of longitudinally spaced apart sensor mounts disposed at selected locations along the jacket, and
a particle motion sensor suspended within each sensor mount by at least one biasing device, a mass of the particle motion sensor and a force rate of the biasing device selected such that a resonant frequency of the particle motion sensor within the sensor mount is within a predetermined range, and wherein each sensor mount is configured such that motion of the jacket, the sensor mount and the strength member is substantially isolated from the respective particle motion sensor, wherein each sensor mount comprises end plates at each longitudinal end of the sensor mount, the sensor mount end plates substantially sealing an interior of the jacket, and wherein each particle motion sensor is at least one of (a) directly exposed to an environment outside the jacket, and (b) surrounded by a membrane, the membrane having flexibility and thickness selected to substantially isolate motion of the streamer from a fluid disposed within the membrane.

* * * * *